(12) United States Patent
Sun et al.

(10) Patent No.: US 9,665,622 B2
(45) Date of Patent: May 30, 2017

(54) PUBLISHING PRODUCT INFORMATION

(71) Applicant: Alibaba Group Holding Limited, Grand Cayman (KY)

(72) Inventors: Li Sun, Hangzhou (CN); Zhenyuan Wu, Hangzhou (CN); Feng Lin, Hangzhou (CN); Jiayu Tang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 531 days.

(21) Appl. No.: 13/802,004

(22) Filed: Mar. 13, 2013

(65) Prior Publication Data
US 2013/0246456 A1    Sep. 19, 2013

(30) Foreign Application Priority Data
Mar. 15, 2012  (CN) .......................... 2012 1 0069464

(51) Int. Cl.
*G06F 17/30* (2006.01)
*G06Q 30/02* (2012.01)

(52) U.S. Cl.
CPC .. *G06F 17/30477* (2013.01); *G06F 17/30997* (2013.01); *G06Q 30/0256* (2013.01)

(58) Field of Classification Search
CPC ......... G06F 17/30997; G06F 17/30442; G06F 17/30867; G06F 17/30477; G06F 17/30616; G06F 17/30731
(Continued)

(56) References Cited

U.S. PATENT DOCUMENTS 8,024,308 B2 *  9/2011  Jones et al. .................... 707/705
8,793,574 B2 *  7/2014  Curtis ............................ 715/256
(Continued)

FOREIGN PATENT DOCUMENTS

CN         102033877        4/2011
CN         102236663        11/2011
(Continued)

OTHER PUBLICATIONS

Beeferman, et al., "Agglomerative Clustering of a Search Engine Query Log", Proceedings of the ACM SIGKDD International Conference on Knowledge Discovery and Data Mining, 2000, pp. 407-416.
(Continued)

*Primary Examiner* — James Trujillo
*Assistant Examiner* — Fariborz Khoshnoodi
(74) *Attorney, Agent, or Firm* — Lee & Hayes, PLLC

(57) ABSTRACT

The present disclosure provides a method and an apparatus for publishing product information. The present disclosure provides a method for publishing product information. Based on a stored search click log of buyers, correlation information between inquiry words and categories in the search click log is calculated. A keyword input by the seller is matched to the inquiry words. The keyword may be a word or a phrase that includes one or more words. If the keyword is matched to at least one inquiry word, at least one category corresponding to the matched inquiry word is obtained based on the correlation information. The product information is stored under one or more categories of the obtained categories. The present techniques improve the accuracy rate of recommended categories to the seller and the return rate of the published product information.

19 Claims, 9 Drawing Sheets

(58) Field of Classification Search
USPC .................................................. 707/754, 769
See application file for complete search history.

(56) References Cited

U.S. PATENT DOCUMENTS

| | | | |
|---|---|---|---|
| 2003/0014317 A1 | 1/2003 | Siegel et al. | |
| 2006/0122979 A1 | 6/2006 | Kapur et al. | |
| 2007/0010990 A1* | 1/2007 | Woo .................................. | 704/4 |
| 2008/0059485 A1* | 3/2008 | Finn ........................ | G06Q 10/10 |
| 2008/0059508 A1 | 3/2008 | Lu et al. | |
| 2008/0183685 A1 | 7/2008 | He et al. | |
| 2009/0106108 A1 | 4/2009 | Ku | |
| 2009/0228353 A1 | 9/2009 | Achan et al. | |
| 2009/0254550 A1 | 10/2009 | Choi et al. | |
| 2009/0299959 A1 | 12/2009 | Ostrovsky et al. | |
| 2010/0010989 A1* | 1/2010 | Li et al. .............................. | 707/5 |
| 2010/0257171 A1 | 10/2010 | Shekhawat | |
| 2012/0047025 A1* | 2/2012 | Strohman ........... | G06F 17/3064 |
| | | | 705/14.71 |
| 2012/0123904 A1 | 5/2012 | Foerster | |
| 2012/0209831 A1 | 8/2012 | Rehman | |
| 2013/0232006 A1* | 9/2013 | Holcomb et al. .......... | 705/14.54 |
| 2014/0236570 A1* | 8/2014 | Heck ................. | G06F 17/30654 |
| | | | 704/9 |

FOREIGN PATENT DOCUMENTS

| | | |
|---|---|---|
| JP | 2007025868 | 2/2007 |
| JP | 2009265833 | 11/2009 |
| JP | 2011154467 | 8/2011 |
| WO | WO2011037603 | 3/2011 |
| WO | WO2011112252 | 9/2011 |

OTHER PUBLICATIONS

Ding, et al., "GoldenBullet: Automated Classification of Product Data in E-commerce", Proceedings of Business Information Systems, 2002, retrieved from the internet on May 14, 2013 at http://www.cs.jyu.fi/ai/vagan/course_papers-Paper_30_SW.pdf.

PCT Search Report mailed May 22, 2013 for PCT application No. PCT/US13/31031, 11 pages.

Wen, et al., "Query Clustering Using User Logs", ACM Transactions on Information Systems, New York, NY, USA, vol. 20, No. 1, 2002, pp. 59-81.

Chinese Office Action dated Nov. 9, 2015, for Chinese Application No. 201210069464.9 (11 pages).

Translated the Japanese Office Action mailed Nov. 1, 2016 for Japanese Patent Application No. 2015-500573, a counterpart foreign application of U.S. Appl. No. 13/802,004, 9 pages.

* cited by examiner

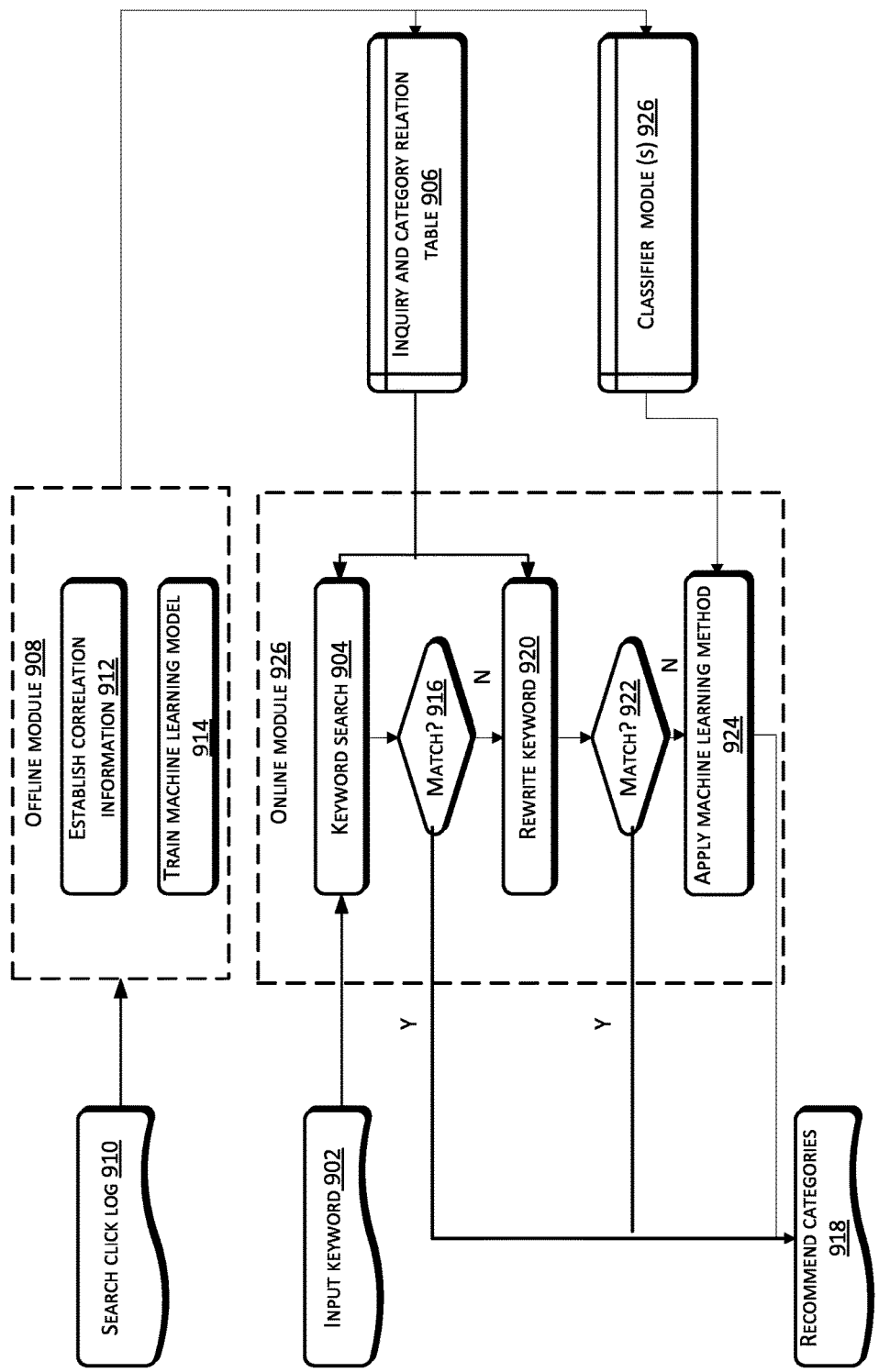

PUBLISHING PRODUCT INFORMATION

CROSS REFERENCE TO RELATED PATENT APPLICATIONS

This application claims foreign priority to Chinese Patent Application No. 201210069464.9 filed on 15 Mar. 2012, entitled "Method and Apparatus for Publishing Product Information," which is hereby incorporated by reference in its entirety.

TECHNICAL FIELD

The present disclosure relates to the field of Internet technology and, more specifically, to a method and an apparatus for publishing product information.

BACKGROUND

With the development of the Internet and the economy globalization, e-commerce has become a main marketing method. Various e-commerce websites on the Internet conduct business through either a vertical sale model or a comprehensive sale model. No matter what type the e-commerce website is, a detailed and fixed categorization system is needed to manage a large quantity of products published at the websites.

When a seller publishes a product, the seller needs to categorize the product into a specific category in the categorization system. Large e-commerce websites, especially e-commerce websites of a comprehensive sale type contain a large number of and different types of products and thus their categorization systems are large. It is not easy for a user to choose a category corresponding to the product from a large number of categories.

The conventional e-commerce websites use hierarchical categorizations that require the seller to select a most relevant category one level after another. With respect to a large e-commerce website with a large categorization system, it is not easy for the seller to choose the category by himself/herself according to levels of categories. In addition, if the seller selects an irrelevant category, it is not beneficial for the e-commerce website to manage products by categories and it affects buyers' experiences of searching products and the buyer's opportunity to present the product.

Some e-commerce websites recommend categories based on input keywords and their relevancy to category names. Such a method for recommending a category based on text relevancies of the input keywords reduces the difficulty of the seller to find categories to some extent. However, if the inquiry word input by the seller does not textually match a category name of a most relevant category, it will find no category or a wrong category and it will be difficult for the e-commerce website to classify products. In addition, under such a method for recommending a category, the e-commerce website administrator sets keywords relevant to the categories based on his/her own preset configuration rules. Such configuration rules, however, cannot reflect historical click information of the buyers to each category. Thus, the recommended category to the seller may not be the most interesting category to the buyer. If the seller publishes the product information based on such inaccurately recommended category, a number of times that the buyers click the published product information is low. That is, a return rate of the published product information is low.

The conventional techniques cause a low return rate of the published product information due to the inaccurate recommended category by the website to the seller when the seller publishes the product information.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a method and an apparatus for publishing product information. The present techniques help resolving low return rates of published information due to inaccurate categories recommended by a website to a seller for publishing product information.

The present disclosure provides a method for publishing product information. Based on a stored search click log of buyers, correlation information between inquiry words and categories in the search click log is calculated. A keyword input by the seller is matched to the inquiry words in the search click log. The keyword may be a word or a phrase that includes one or more words. If the keyword is matched to at least one inquiry word in the search click log, at least one category corresponding to the matched inquiry word is obtained based on the correlation information. The product information is stored under one or more categories of the obtained categories.

In an example, after the keyword input by the seller is matched to the inquiry words in the search click log, if no matched inquiry word is found from the search click log, one or more words from the keyword input by the seller may be deleted. The keyword with the deletion of the one or more words therein is matched to the inquiry words in the search click log. If the keyword with the deletion of the one or more words therein is matched to at least one inquiry word, at least one category corresponding to the matched inquiry word is obtained based on the correlation information. The product information is stored under one or more categories of the obtained categories.

For example, the process for deleting the one or more words from the keyword may include labeling an importance value of each word in the keyword based on characteristics including syntax, grammar, semantics, and/or statistics characteristics and deleting the one or more words whose importance values are lower than a preset importance value threshold.

For example, the keyword with the deletion of the one or more words therein is matched to the inquiry words in the search click log. If the keyword with the deletion of the one or more words therein is not matched to at least one inquiry word, the keyword input by the seller is classified into one or more characteristics based on syntax, grammar, and/or semantics. Posterior probabilities of the characteristics under each category in the search click log are calculated. One or more categories whose corresponding posterior probabilities are higher than a preset probability threshold are selected as categories matching the keyword and returned.

For instance, a following formula may be used to calculate the posterior probabilities of the characteristics under each category in the search click log:

$$p(y|x) = \frac{1}{Z(x)}\exp\left(\sum_j \lambda_j f_j(x, y)\right)$$

y represents a category in the search click log. x represents a keyword input by the seller. $f_j(x, y)$ represents a $j^{th}$ characteristic of x under the category y. $\lambda_j$ represents a weight of the $j^{th}$ characteristic. $Z(x)$ represents a normalization factor.

For instance, a following formula may be used to calculate the correlation information between inquiry words and categories in the search click log based on the stored search click log of buyers:

$$p(category_j|query_i) = \lambda_1 p'(category_j|query_i) + \lambda_2 p''(category_j|query_i, offer)$$

$\lambda_1$ and $\lambda_2$ represent weights, $\lambda_1 \in [0,1]$, $\lambda_2 \in [0,1]$, $\lambda_2 + \lambda_2 = 1$;

$p'(category_j|query_i)$ represents a conditional probability between an inquiry word and a category of guidance. For example, a click to the category of guidance directly describes a relationship between the queries and the category of guidance.

$p''(category_j|query_i, offer)$ represents a conditional probability between an inquiry word and a product category.

$$p'(category_j | query_i) = \frac{count(category_j, query_i)}{count(query_i)}$$

$count(category_j, query_i)$ represents a number of times that buyers click a category represented by $category_j$ when the buyers input an inquiry word represented by $query_i$ within a period of time, $count(query_i)$ represents a number of times that the buyers input the inquiry word represented by $query_i$ within the period of time.

$$p''(category_j | query_i, offer) = \frac{count(category_j, query_i | offer)}{count(query_i | offer)}$$

$count(category_j, query_i|offer)$ represents a number of times that the buyers click a product represented by offer under the category represented by $category_j$ when the buyers input an inquiry word represented by $query_i$ within the period of time. $count(query_i|offer)$ represents a number of times that the buyers input the inquiry word represented by $query_i$ during the period of time.

The process that obtains the categories corresponding to the matching inquiry word based on the correlation information may include ranking the categories represented by $category_j$ corresponding to the inquiry word $query_i$ according to their confidence degrees and the categories represented by $category_j$ respectively after the ranking are returned as the result.

The present disclosure also provides an apparatus for publishing product information. The apparatus may include a first calculating unit, a first matching unit, a first obtaining unit, and a first publishing unit. The first calculating unit calculates, based on a stored search click log of buyers, correlation information between inquiry words and categories in the search click log. The first matching unit matches a keyword input by a seller to the inquiry words in the search click log. The keyword may be a word or a phrase that includes one or more words. The first obtaining unit, when the keyword is matched to at least one inquiry word, obtains at least one category corresponding to the matched inquiry word based on the correlation information. The first publishing unit stores the product information under one or more categories of the categories obtained by the first obtaining unit.

In an example, the apparatus may also include a deleting unit, a second matching unit, a second obtaining unit, and a second publishing unit. If the first matching unit cannot find the matching inquiry word in the search click log, the deleting unit deletes one or more words from the keyword input by the seller. The second matching unit matches the keyword with the deletion of the one or more words therein to the inquiry words in the search click log. If the second matching unit finds at least one matched inquiry word in the search click log, the second obtaining unit obtains at least one category corresponding to the matched inquiry word based on the correlation information. The second publishing unit stores the product information under one or more categories of the categories obtained by the second publishing unit.

For example, the deleting unit may include a labeling value module and a deleting module. The labeling value module labels an importance value of each word in the keyword based on characteristics including syntax, grammar, semantics, and/or statistics characteristics. The deleting module deletes the one or more words whose importance values are lower than a preset importance value threshold.

For example, the apparatus may also include a characteristic analyzing unit, a second calculating unit, and a selecting unit. If the second matching unit cannot match the keyword with the deletion of the one or more words therein to the inquiry words in the search click log, the characteristic analyzing unit classifies the keyword input by the seller into one or more characteristics based on syntax, grammar, and/or semantics. The second calculating unit calculates posterior probabilities of the characteristics under each category in the search click log. The selecting unit selects one or more categories whose corresponding posterior probabilities are higher than a preset probability threshold as the categories matching the keyword and returned.

In the above example embodiments, the present techniques, based on the stored search click log of the buyers, calculate the correlation information between the inquiry words and the categories in the search click log. When the seller publishes the product at the e-commerce website, a website server matches the keyword input by the seller to the inquiry words in the search click log. The keyword may be a word or a phrase that includes one or more words. Based on the matching result and the above correlation relationship, the category corresponding to the matched inquiry is recommended to the seller so that the seller may accurately store the product information under a related category. The related category is a category that the buyer may select when the product information search is conducted by using the inquiry word that matches the keyword. When the buyers inquire the related product information to the website server according to the inquiry word, the website server obtains the related category corresponding to the received inquiry word in the search click log, and conducts the product information search within the related category. As the sellers have stored the product information in the related category when the sellers publish the product information, the website server will quickly obtain and return the product information published by the sellers. As the returned product information matches the inquiry word, the probability that the buyer clicks the product information published by the seller increases. The present techniques also increase the accuracy of the recommended categories by the website to the seller and the return rate of the published product information.

BRIEF DESCRIPTION OF THE DRAWINGS

To better illustrate embodiments of the present disclosure, the following is a brief introduction of FIGs to be used in descriptions of the embodiments. It is apparent that the following FIGs only relate to some embodiments of the present disclosure. A person of ordinary skill in the art can obtain other FIGs according to the FIGs in the present disclosure without creative efforts.

FIG. 9 illustrates a flowchart of an example method for recommending categories implemented by an example product information publishing apparatus.

DETAILED DESCRIPTION

The following descriptions describe some example embodiments of the present disclosure by reference to the FIGs. Unless contradicted, the example embodiments and features in the example embodiments may be combined with each other.

Figure 1:
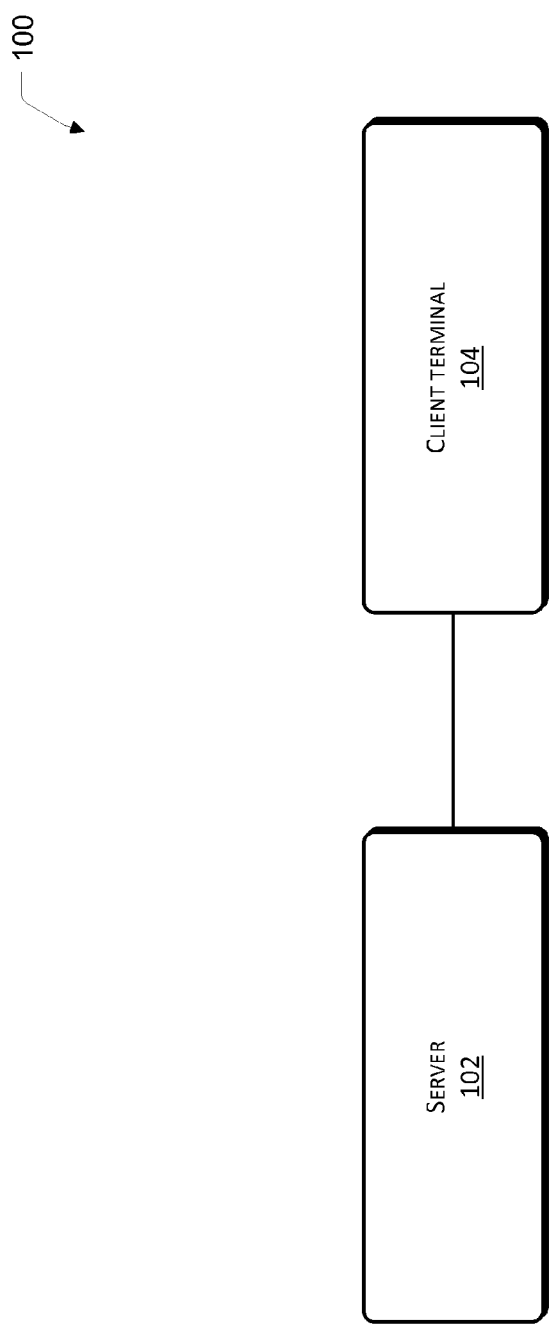
FIG. 1 illustrates an example computing system that implements principles of the present disclosure.

Prior to the description of the details of the example embodiments of the present disclosure, FIG. 1 illustrates an example computing system that implements principles of the present disclosure. Within the description below, unless stated otherwise, symbols representing one or more operations and implementations performed by one or more computers are referenced to describe the example embodiments of the present disclosure. Thus, it may be understood that the operations or implementations performed by the computers include manipulations, by processing units of the computers, of electronic signals representing data in a structural form. Such manipulation changes data or maintains the data at the computer storage media of the computer, and reconfigures or changes the operations of the computers in a manner understood by one of ordinary skill in the art. The data structure maintaining the data may have a special attribute defined by format of the data and a physical location in the computer storage media. It should be understood that the embodiments herein are merely presented for illustration instead of limiting the scope of the present disclosure. The embodiments and features in each embodiment of the present disclosure may be combined when there is no conflict. One of ordinary skill in the art may understand that the operations and implementations described below may be also realized by hardware.

In the FIGs, the same numeral may refer to the same element. The principles of the present disclosure are shown in a suitable computing environment. The present disclosure describes some example embodiments below, which shall not exclude any other alternative embodiments and be used to limit the present disclosure.

FIG. 1 illustrates a diagram of an example product computer system 100. The computer system 100 is just an example of the suitable computing environment, and shall not be construed as a limitation of the scope or function of the present techniques. The computer system shall not be construed as relying on or dependent on any component or combination of components as shown in FIG. 1.

The computing system may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

In the example of FIG. 1, the computing system 100 may act as a product information publishing system and includes at least a website server 102 and one or more client terminals 104. The website server 102 may include but is not limited to one or more multiple controlling processors (MCUs), one or more field programmable gate arrays (FPGAs), or any other processing devices, one or more computer storage devices that store data, and one or more transmission devices that communicate with the client terminal 104. The client terminal 104 may include one or more MCUs, one or more transmission devices that communicate with the website server 102, and one or more display devices that interact with a user. In the present disclosure, a product information publishing system may be defined as software, firmware, microware, hardware, or one or more combinations thereof that implement the functionalities. The product information publishing system may be even distributive to implement the distributive functionalities.

In some examples of the present disclosure, the term "module," "component," or "unit" may refer to a software object or instance performed by the computing system 100. Different components, modules, units, engines, or service described herein may be implemented as objects or processes performed by the computing system 100 (such as a single thread). Although the system and method described herein may be implemented as software, hardware or a combination of hardware and software may also be used for the implementation.

Figure 2:
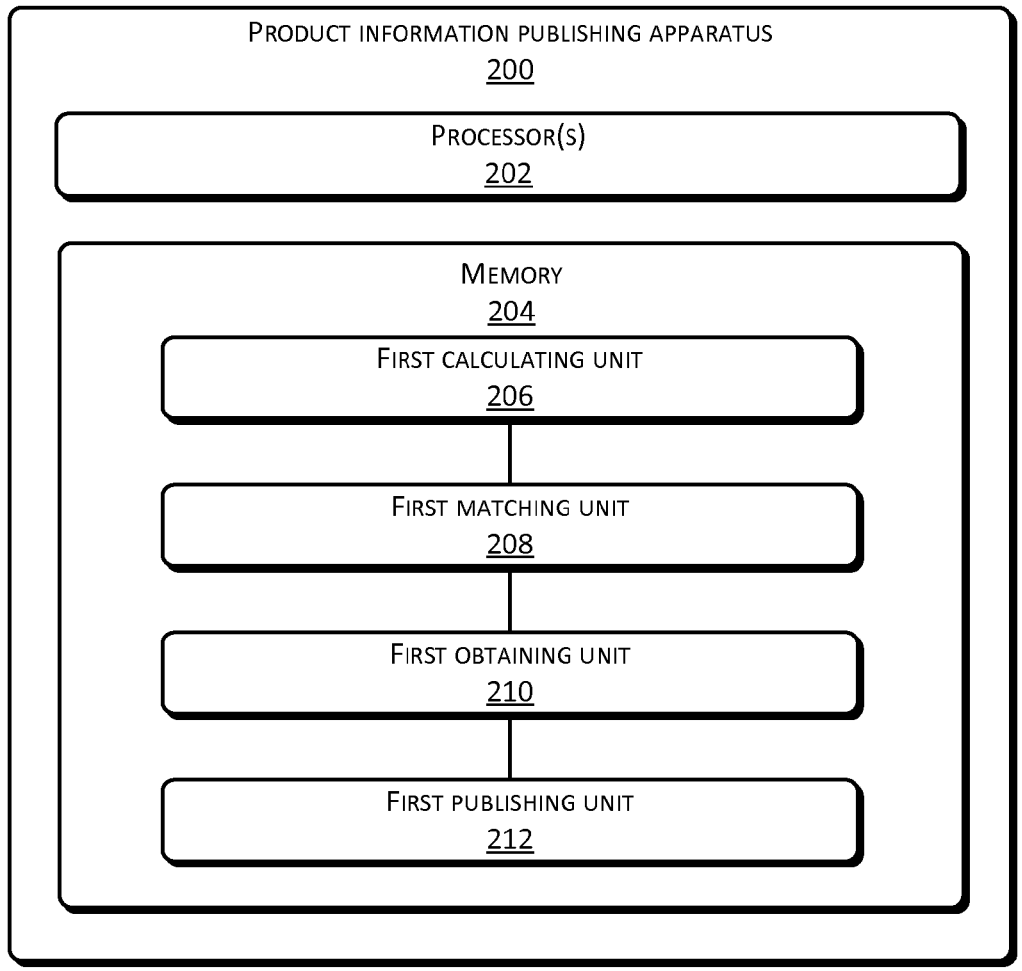
FIG. 2 illustrates a diagram of a first example product information publishing apparatus.

The following is a description of a first example embodiment in accordance with the present disclosure. FIG. 2 illustrates a diagram of an example product information publishing apparatus 200. The product information publishing apparatus 200 may be located at the website server 102 or the terminal 104.

The product information publishing apparatus 200 in FIG. 2 may include one or more processor(s) 202 and memory 204. The memory 204 is an example of computer-readable media. As used herein, "computer-readable media" includes computer storage media and communication media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage apparatus, or any other non-transmission medium that can be used to store information for access by a computing apparatus. In contrast, communication media may embody computer-readable instructions, data structures, program modules, or other data in a modulated data signal, such as a carrier wave. As defined herein, computer storage media does not include communication media.

The memory 204 may store therein program units or modules and program data. In the example of FIG. 2, the memory 204 may store therein a first calculating unit 206, a first matching unit 208, a first obtaining unit 210, and a first publishing unit 212. The first calculating unit 206 calculates, based on a stored search click log of buyers, correlation information between inquiry words and categories in the search click log. The first matching unit 208 matches a keyword input by a seller to the inquiry words in the search click log. The keyword may be a word or a phrase that includes one or more words. The first obtaining unit 210, when the keyword is matched to at least one inquiry word in the search click log, obtains at least one category corresponding to the matched inquiry word based on the correlation information. The first publishing unit 212 stores the product information under one or more categories of the categories obtained by the first obtaining unit 210. In other words, the first publishing unit 212 publishes the product information under the one or more categories of the obtained categories.

In the above example embodiment, the present techniques, based on the stored search click log of the buyers, calculate the correlation information between the inquiry words and the categories in the search click log. When the seller publishes the product at the e-commerce website, a website server matches the keyword input by the seller to the inquiry words in the search click log. The keyword may be a word or a phrase that includes one or more words. Based on the matching result and the above correlation relationship, the category corresponding to the matched inquiry is recommended to the seller so that the seller may accurately store the product information under a related category. The related category is a category that the buyer may select when the product information search is conducted by using the inquiry word that matches the keyword. When the buyers inquires the related product information to the website server according to the inquiry word, the website server obtains the related category corresponding to the received inquiry word in the search click log, and conducts the product information search within the related category. As the sellers have stored the product information in the related category when the sellers publish the product information, the web site server will quickly obtain and return the product information published by the seller. As the returned product information matches the inquiry word, the probability that the buyer clicks the product information published by the seller increases. The present techniques also increase the accuracy of the recommended categories by the website to the seller and the return rate of the published product information.

Figure 3:
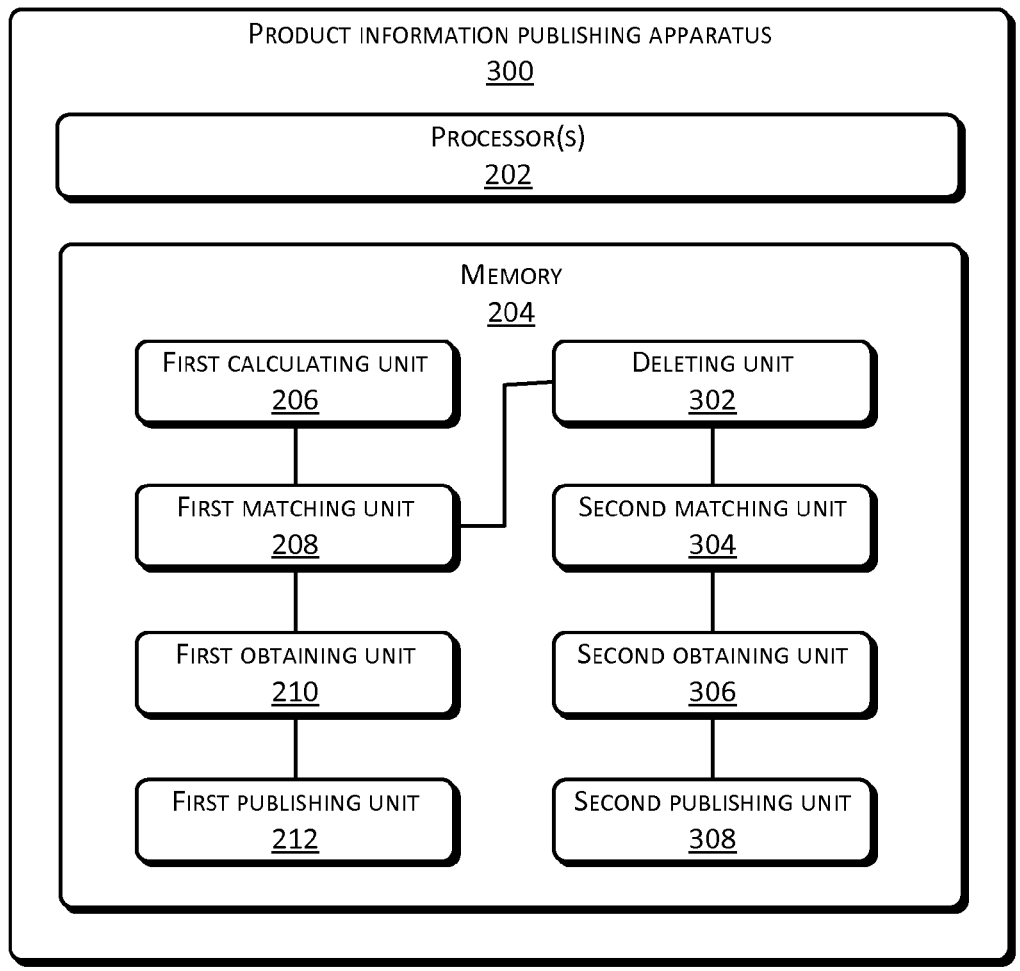
FIG. 3 illustrates a diagram of a second example product information publishing apparatus.

The present techniques may also improve the product information publishing apparatus 200 to recommend the categories to the seller even when the first matching unit 208 cannot find the matched inquiry word in the search click log. As shown in FIG. 3, a product information publishing apparatus 300 may include one or more processor(s) 202 and memory 204. The memory 204 may also store therein a deleting unit 302, a second matching unit 304, a second obtaining unit 306, and a second publishing unit 308, in addition to the first calculating unit 206, the first matching unit 208, the first obtaining unit 210, and the first publishing unit 212.

If the first matching unit 208 cannot find the matched inquiry word in the search click log, the deleting unit 302 deletes one or more words from the keyword input by the seller. The second matching unit 304 matches the keyword with the deletion of the one or more words therein to the inquiry words in the search click log. If the second matching unit 304 finds at least one matched inquiry word in the search click log, the second obtaining unit 306 obtains at least one category corresponding to the matched inquiry word based on the correlation information. The second publishing unit 308 stores the product information under one or more categories of the categories obtained by the second obtaining unit 306.

For example, the first matching unit 208 and the second matching unit 304 may be merged into one matching unit or two separate matching units. The first obtaining unit 210 and the second obtaining unit 306 may be merged into one obtaining unit or two separate obtaining units. The first publishing unit 212 and the second publishing unit 308 may be merged into one publishing unit or two separate publishing units.

For example, when the first matching unit 208 cannot find the matched inquiry word in the search click log, the keyword input by the seller may be rewritten, such as rephrased. During the rewriting process, one or more words in the keyword input by the seller may be deleted. The rewritten keyword is matched again to the inquiry words in the search click log. The operations to recommend categories to the seller may be continued. The present techniques thus improve the covering rate and accuracy rate of the recommended categories for the product to be published by the seller.

Figure 4:
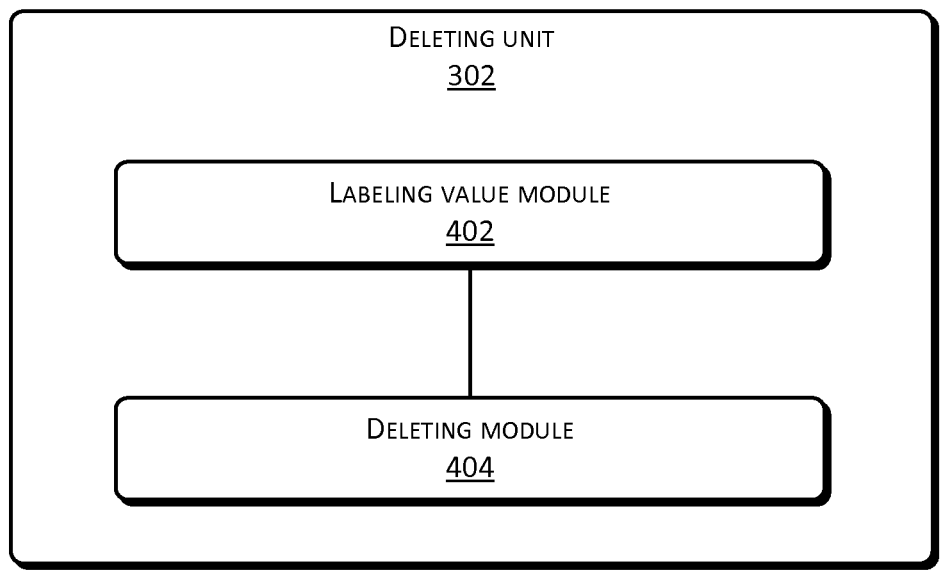
FIG. 4 illustrates a diagram of an example deleting unit.

The present disclosure also provides another technique of deleting a portion of terms in the keyword input by the seller to match the keyword input by the seller to the inquiry words in the search click log. As shown in FIG. 4, the deleting unit 302 may include a labeling value module 402 and a deleting module 404. The labeling value module 402 labels an importance value of each word in the keyword based on characteristics including syntax, grammar, semantics, and/or statistics characteristics. The deleting module 404 deletes the one or more words from the keyword whose importance values are lower than a preset importance value threshold.

Each word in the keyword is labeled and valued based on the characteristics including syntax, grammar, semantics, and/or statistics characteristics. Thus, information contained in the keyword is selectively chosen and deleted according to their importance degrees. The accuracy rate of the recommended categories for the product to be published by the seller is further ensured.

Figure 5:
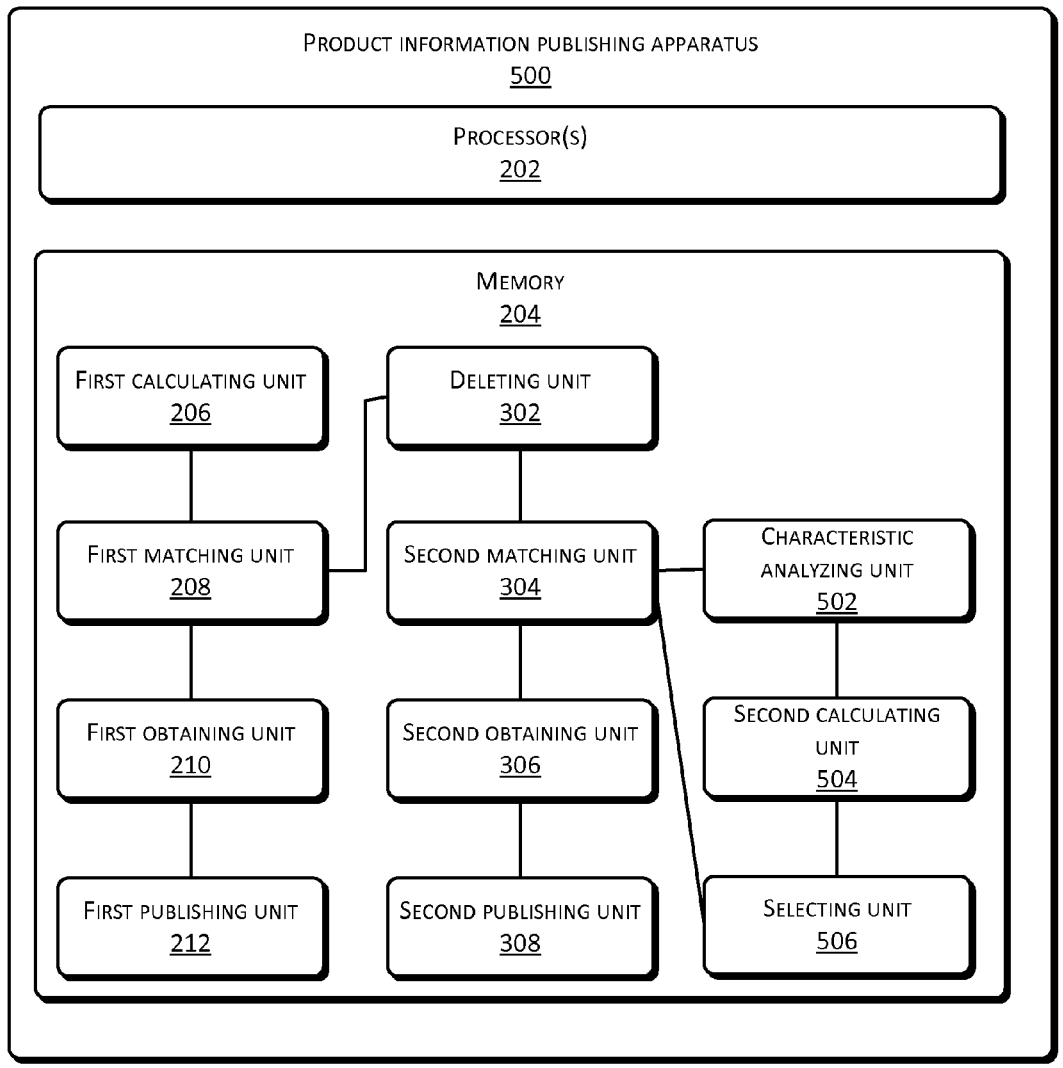
FIG. 5 illustrates a diagram of a third example product information publishing apparatus.

The present techniques may further modify the second product information publishing apparatus 200 to continue to recommend the categories to the product of the seller when the second matching unit 304 cannot find the matched inquiry words in the search click log. As shown in FIG. 5, a third product information publishing apparatus 500, in addition to those units included in the second product information publishing apparatus 300, may further include a characteristic analyzing unit 502, a second calculating unit 504, and a selecting unit 506. If the second matching unit 304 cannot match the keyword with the deletion of the one or more words therein to the inquiry words in the search click log, the characteristic analyzing unit 502 classifies the keyword input by the seller into one or more characteristics based on syntax, grammar, and/or semantics. The second calculating unit 504 calculates posterior probabilities of the characteristics under each category in the search click log respectively. The selecting unit 506 selects one or more categories whose corresponding posterior probabilities are higher than a preset probability threshold as the categories matching the keyword and returned.

For example, when the second matching unit 304 cannot find the matched inquiry word in the search click log, the posterior probabilities of the one or more characteristics under each category in the search click log are calculated. The calculated posterior probabilities are used as the basis to select the categories matching the keyword. Thus, the present techniques may continue to recommend the categories to the seller for the product and the covering rate of the recommended categories for the product to be published by the seller is further increased.

For instance, the present disclosure also provides a method for calculating the posterior probabilities of the one or more characteristics under each category in the search click log. A following formula may be used to calculate the posterior probabilities of the characteristics under each category in the search click log:

$$p(y|x) = \frac{1}{Z(x)} \exp\left(\sum_j \lambda_j f_j(x, y)\right)$$

y represents a category in the search click log. x represents the keyword input by the seller. $f_j(x, y)$ represents a $j^{th}$ characteristic of x under the category y. $\lambda_j$ represents a weight of the $j^{th}$ characteristic. $Z(x)$ represents a normalization factor.

For instance, with respect to given information included in a respective inquiry word, which include syntax-level, grammar-level, and/or semantics-level characteristics, a confidence degree for the respective inquiry word under a respective category may be defined by:

p(c is correct|x), which represents inquiring a posterior probability that the given information of the keyword x correctly belongs to the category. A conditional maximum entropy model may be used to calculate the posterior probability. The conditional maximum entropy model is just one example for calculating the posterior probabilities and cannot be used to restrict the present disclosure. Some other techniques may be used to calculate the posterior probabilities, such as the linear regression recursive method and the support vector machine method.

The present disclosure also provides a method for calculating the correlation information between the inquiry words and the categories in the search click log based on the stored search click log of buyers. For instance, a following formula may be used:

$$p(category_j | query_i) = \lambda_1 p'(category_j | query_i) + \lambda_2 p''(category_j | query_i, \text{offer})$$

$\lambda_1$ and $\lambda_2$ represent weights, $\lambda_1 \in [0,1]$, $\lambda_2 \in [0,1]$, $\lambda_2 + \lambda_2 = 1$;

$p'(category_j | query_i)$ represents a conditional probability between an inquiry word and a category of guidance;

$p''(category_j | query_i, \text{offer})$ represents a conditional probability between an inquiry word and a product category.

$$p'(category_j | query_i) = \frac{\text{count}(category_j, query_i)}{\text{count}(query_i)}$$

count($category_j$, $query_i$) represents a number of times that buyers click a category represented by $category_j$ when the buyers input an inquiry word represented by $query_i$ within a period of time, count($query_i$) represents a number of times that the buyers input the inquiry word represented by $query_i$ within the period of time.

$$p''(category_j | query_i, \text{offer}) = \frac{\text{count}(category_j, query_i | \text{offer})}{\text{count}(query_i | \text{offer})}$$

count($category_j$, $query_i$|offer) represents a number of times that the buyers click a product represented by offer under the category represented by $category_j$ when the buyers input an inquiry word represented by $query_i$ within the period of time. count($query_i$|offer) represents a number of times that the buyers input the inquiry word represented by $query_i$ during the period of time.

The categories represented by $category_j$ corresponding to the inquiry word $query_i$ may be ranked according to their confidence degrees and the categories represented by $category_j$ after the ranking are returned as the result. The present techniques calculate the correlation information between the inquiry words and the categories in the search click log and ensure that the website may provide the seller with measures of degrees of interests of the buyers when the product is placed under different categories.

Figure 6:
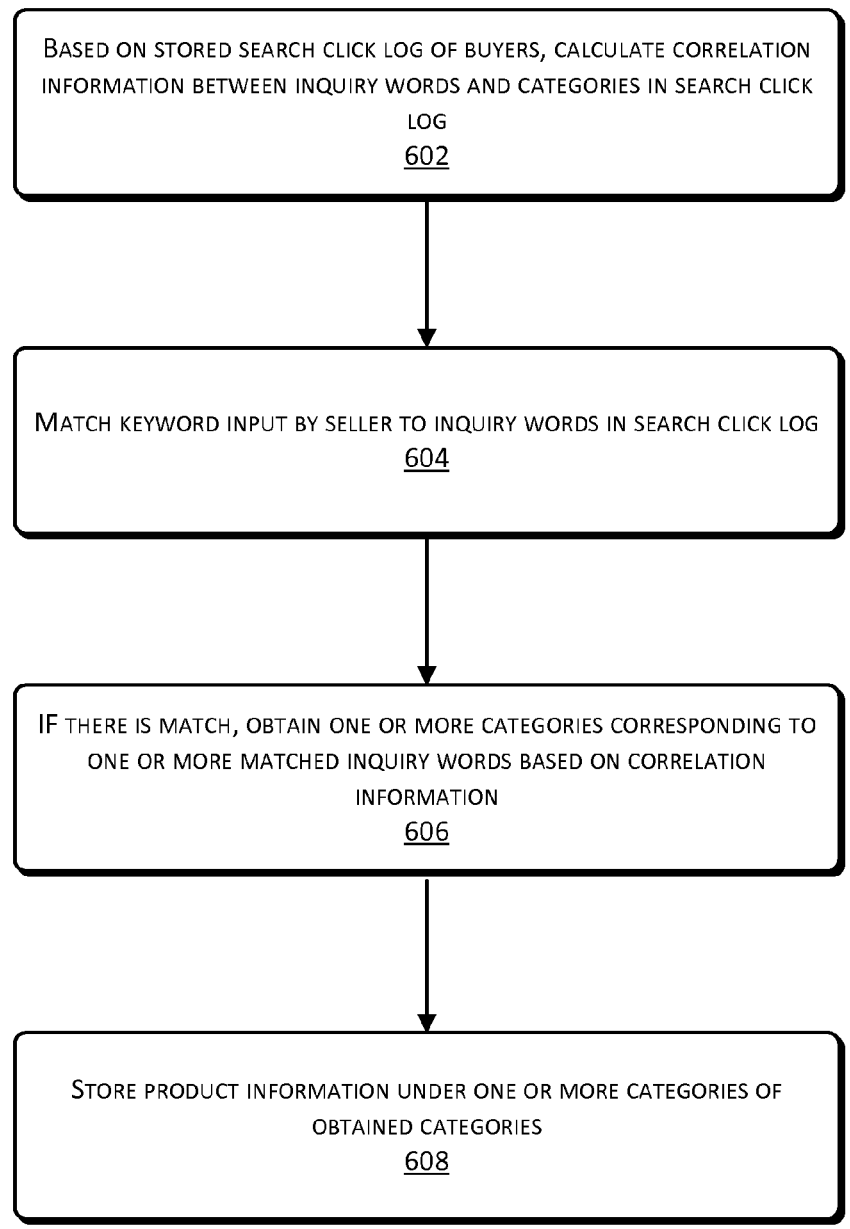
FIG. 6 illustrates a flowchart of an example method for publishing the product information.

The following describes a second example embodiment of the present disclosure. Based on the product information publishing apparatuses as shown in FIGS. 1-5, the present disclosure also provides one or more methods for publishing product information. FIG. 6 illustrates a flowchart of an example method for publishing the product information.

At 602, based on a stored search click log of buyers, correlation information between inquiry words and categories in the search click log is calculated.

At 604, a keyword input by a seller is matched to the inquiry words in the search click log. The keyword may be a word or a phrase that includes one or more words.

At 606, if the keyword is matched to at least one inquiry word in the search click log, at least one category corresponding to the matched inquiry word is obtained based on the correlation information.

At 608, the product information is stored under one or more categories of the obtained categories. In other words, the product information is published under the one or more categories of the obtained categories.

In the above example method, the present techniques, based on the stored search click log of the buyers, calculate the correlation information between the inquiry words and the categories in the search click log. When the seller publishes the product at the e-commerce website, a website server matches the keyword input by the seller to the inquiry words. The keyword may be a word or a phrase that includes one or more words. Based on the matching result and the above correlation relationship, the category corresponding to the matched inquiry is recommended to the seller so that the seller may accurately store the product information under a related category. The related category is a category that the buyer may select when the product information search is conducted by using the inquiry word that matches the keyword. When the buyers inquires the related product information to the website server according to the inquiry word, the website server obtains the related category corresponding to the received inquiry word in the search click log, and conducts the product information search within the related category. As the sellers have stored the product information in the related category when the sellers publish the product information, the website server will quickly obtain and return the product information published by the sellers. As the returned product information matches the inquiry word, the probability that the buyer clicks the product information published by the seller increases. The present techniques also increase the accuracy of the recommended categories by the website to the seller and the return rate of the published product information.

In an example, after the keyword input by the seller is matched to the inquiry words in the search click log, if no matched inquiry word is found from the search click log, one or more words from the keyword input by the seller may be deleted. The keyword with the deletion of the one or more words therein is matched to the inquiry words in the search click log. If the keyword with the deletion of the one or more words therein is matched to at least one inquiry word, at least one category corresponding to the matched inquiry word is obtained based on the correlation information and the product information is stored under one or more categories of the obtained categories.

For example, the process for deleting the one or more words from the keyword may include labeling an importance value of each word in the keyword based on characteristics including syntax, grammar, semantics, and/or statistics characteristics and deleting the one or more words whose importance values are lower than a preset importance value threshold.

For example, the keyword with the deletion of the one or more words therein is matched to the inquiry words in the search click log. If the keyword with the deletion of the one or more words therein is not matched to at least one inquiry word in the search click log, the keyword input by the seller is classified into one or more characteristics based on syntax, grammar, and/or semantics. Posterior probabilities of the characteristics under each category in the search click log are calculated. One or more categories whose corresponding posterior probabilities are higher than a preset probability threshold are selected as categories matching the keyword and returned.

For instance, the present disclosure also provides a method for calculating the posterior probabilities of the one or more characteristics under each category in the search click log. A following formula may be used to calculate the posterior probabilities of the characteristics under each category in the search click log:

$$p(y|x) = \frac{1}{Z(x)} \exp\left(\sum_j \lambda_j f_j(x, y)\right)$$

y represents a category in the search click log. x represents the keyword input by the seller. $f_j(x, y)$ represents a $j^{th}$ characteristic of x under the category y. $\lambda_j$ represents a weight of the $j^{th}$ characteristic. $Z(x)$ represents a normalization factor.

For instance, with respect to given information included in a respective inquiry word, which include syntax-level, grammar-level, and/or semantics-level characteristics, a confidence degree for the respective inquiry word under a respective category may be defined by:

p(c is correct|x), which represents inquiring a posterior probability that the given information of the keyword x correctly belongs to the category. A conditional maximum entropy model may be used to calculate the posterior probability. The conditional maximum entropy model is just one example for calculating the posterior probabilities and should not be used to restrict the present disclosure. Some other techniques may be used to calculate the posterior probabilities, such as the linear regression recursive method and the support vector machine method.

The present disclosure also provides a method for calculating the correlation information between the inquiry words and the categories in the search click log based on the stored search click log of buyers. For instance, a following formula may be used:

$$p(category_j|query_i) = \lambda_1 p'(category_j|query_i) + \lambda_2 p''(category_j|query_i, offer)$$

$\lambda_1$ and $\lambda_2$ represent weights, $\lambda_1 \in [0,1]$, $\lambda_2 \in [0,1]$, $\lambda_1 + \lambda_2 = 1$;

p'($category_j$|$query_i$) represents a conditional probability between an inquiry word and a category of guidance or a category displayed in a guidance or navigation area of the website.

p'' ($category_j$|$query_i$, offer) represents a conditional probability between an inquiry word and a product category.

$$p'(category_j | query_i) = \frac{count(category_j, query_i)}{count(query_i)}$$

count($category_j$,$query_i$) represents a number of times that the buyers click a category represented by $category_j$ when the buyers input an inquiry word represented by $query_i$ within a period of time, count($query_i$) represents a number of times that the buyers input the inquiry word represented by $query_i$ within the period of time.

$$p''(category_j | query_i, offer) = \frac{count(category_j, query_i | offer)}{count(query_i | offer)}$$

count($category_j$,$query_i$|offer) represents a number of times that the buyers click a product represented by offer under the category represented by $category_j$ when the buyers input an inquiry word represented by $query_i$ within the period of time. count($query_i$|offer) represents a number of times that the buyers input the inquiry word represented by $query_i$ during the period of time.

The categories represented by $category_j$ corresponding to the inquiry word $query_i$ may be ranked according to their confidence degrees and the categories represented by $category_j$ after the ranking are returned as the result. The present techniques calculate the correlation information between the inquiry words and the categories in the search click log and ensure that the website may provide the seller with measures of degrees of interests of the buyers when the product is placed under different categories.

The following describes a third example embodiment of the present disclosure. Based on the product information publishing apparatuses and methods as shown in FIGS. 1-6, the present disclosure also provides another product information publishing apparatus.

Figure 7:
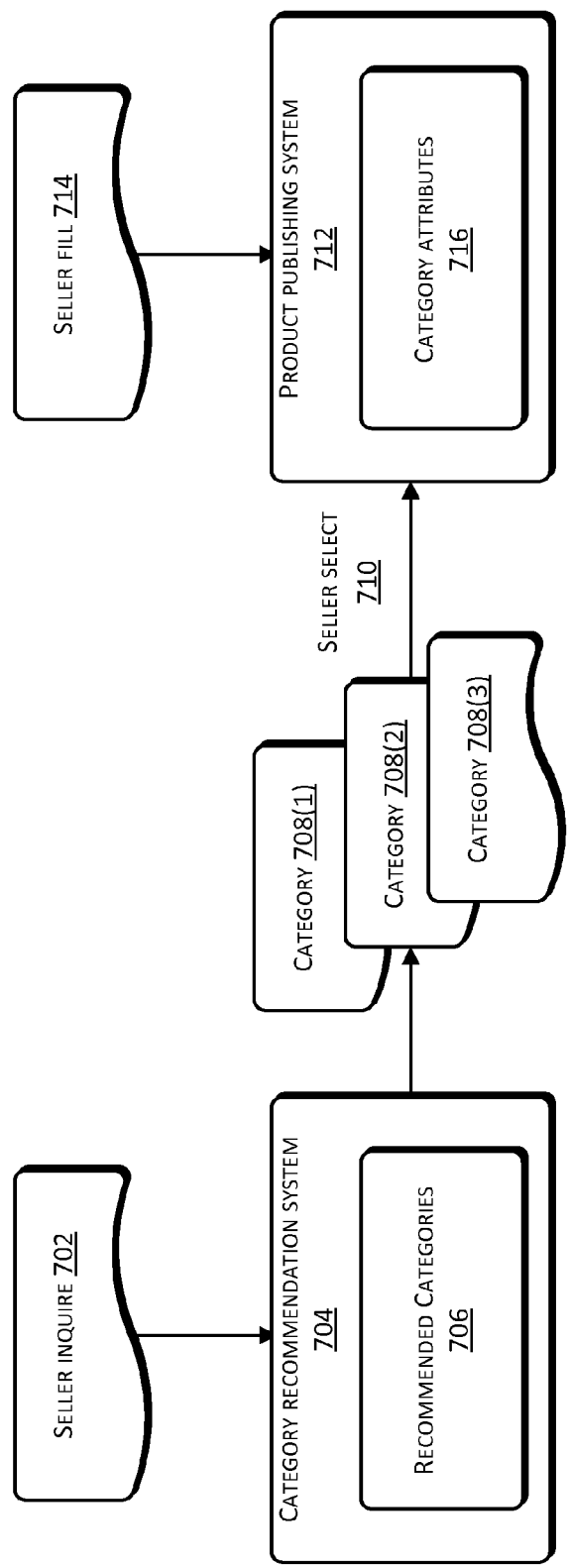
FIG. 7 illustrates a functional diagram of an example product information publishing apparatus.

FIG. 7 illustrates a flowchart of another example apparatus for publishing the product information. As shown in FIG. 7, when the seller publishes the product at the e-commerce website, the seller makes inquiry 702 by inputting a keyword related to the product information to be published. The keyword includes one or more words or phrases, or a short sentence in natural languages. The e-commerce website, through a computing system such as a category recommendation system 704, provides one or more recommended categories 706 related to the product based on the keyword and ranks the categories in a certain order. For instance, the ranked recommended categories may include a category 708(1), 708(2), . . . , 708(n), where n may be any integer. The seller selects 710 one or more suitable categories from the ranked recommended categories. In some examples, a product publishing system 712 may provide an interface to the seller so that the seller fills in 714 the category attributes 716 through a terminal. The product publishing system 712 may output essential attributes and optional attributes of the selected category for the user to choose or fill in, which helps the user to input information and standardizes the published product information.

The products at the e-commerce website may be classified into one or more categories. When conducting a search, the buyers may click and view some products. Thus, the correlation information is established between the categories of the products and the inquiry. The correlation information may include relevance degrees between the inquiry word and the categories of the products and also a measurement of interests of the buyers to the products under different categories. When conducting the search, the buyers may also click one or more categories of guidance, such as categories displayed at a guidance area at a webpage of the website, which more directly reflects the correlation information between the inquiry word and the categories.

The correlation information may be used to describe the confidence degree between the inquiry words and the categories. The search click log of the buyer within a period of time, such as 3 or more months, is used to establish an inquiry and category relation table.

For example, for a given query represented by $query_i$, a category set including the categories corresponding to the product and categories of guidance clicked by the buyers is represented by $\{category_1, category_2, \ldots category_j \ldots\}$. For the $query_i$, the conditional probability of the recommend category represented by $category_j$ is defined as $p(category_j|query_i)$, which describes the confidence degree of the recommend category category, to the query $query_i$. With respect to all categories, the following condition is met.

$$\sum_j p(category_j | query_i) = 1 \qquad (1)$$

For example, the search click log of the buyers may have two components. One component is a number of clicks to the category of guidance and the other component is a number of clicks to the products.

A click to the category of guidance directly describes the relationship between the queries and the categories. The conditional probability between the query and the recommended category may be calculated by the following formula:

$$p'(category_j | query_i) = \frac{count(category_j, query_i)}{count(query_i)} \qquad (2)$$

$count(category_j,query_i)$ represents a number of times that the buyers click the category represented by $category_j$ when the buyers input the inquiry word represented by $query_i$ within a period of time, $count(query_i)$ represents a number of times that the buyers input the inquiry word represented by $query_i$ within the period of time.

With respect to the number of clicks to the products, each time the buyers click the product after inputting the query, one correlation occurs between the query and the category corresponding to the product. Thus, the conditional probability between the query and the recommend category is calculated based on the search click log. For instance, the following formula may be used to calculate the conditional probability.

$$p''(category_j | query_i, offer) = \frac{count(category_j, query_i | offer)}{count(query_i | offer)} \qquad (3)$$

$count(category_j,query_i|offer)$ represents a number of times that the buyers click a product represented by offer under the category represented by $category_j$ when the buyers input an inquiry word represented by $query_i$ within the period of time. $count(query_i|offer)$ represents a number of times that the buyers input the inquiry word represented by $query_i$ during the period of time.

The conditional probabilities obtained from the above two types of click information are weighted to obtain the confidence degree of the recommended category. For instance, a linear weighted method may be used as follows:

$$p(category_j|query_i)=\lambda_1 p'(category_j|query_i)+\lambda_2 p''(category_j|query_i,offer) \qquad (4)$$

$\lambda_1$ and $\lambda_2$ represent weights. For instance, the experience values or linear recursive methods may be used to determine $\lambda_1$ and $\lambda_2$.

A large number of inquiry and category relation tables may be established based on the search query log. The relationship between a respective inquiry and a respective category may be represented by a probability value. The score of the probability value also shows a relevant degree between the respective inquiry and the respective category from a perspective of the buyers.

When publishing the product, the seller inputs a keyword and the keyword is then searched in the inquiry and category relation tables. If the buyers also conduct a same or similar query, the relationships between the keyword and the categories may be located. The categories may be displayed to the seller according to the rankings of their relevant degrees to chose. The recommendation of keyword is thus accomplished.

In another example, the present disclosure provides another improvement to the above apparatus. When the keyword input by the seller is complex and tedious and has not appeared in the search click log of the buyers, the keyword input by the seller may be rewritten. The key information of the keyword' subject is retained while some unimportant words may be deleted from the keyword to reduce a length of the keyword. Thus, the keyword after the deletion of certain words therein will have a higher probability of appearance in the search click log. In addition, the rewriting retains the key information of the keyword's subject and the recommended category may be fit for the original query.

There are one or more methods for rewriting the keyword. In an example of the following method for rewriting the keyword, at a first step, an importance value of each word in the keyword may be calculated based on characteristics including syntax, grammar, semantics, and/or statistics characteristics.

The syntax may include a length of the word. A too short or too long length predicts a difference of importance of the word's subject. The syntax may include components of the word. The word composed of pure numbers may have different importance in subject from other words. The syntax may also include a suffix that may represent classification information of the word, such as "er" or "or."

The grammar may include a syntactical function of the word to reflect the importance degree of the word. For instance, an adjective or an adverb may be less likely to reflect information focus and more likely to reflect a modification relationship of attributes and classifications of the information focus. In contrast, a noun may have more contribution to the information subject. The grammar may include an analysis of phrase. The phrase is used to determine an overall relationship between the words at the grammar level. The syntax may also include a grammar centric word, which may be identified based on grammar and template information, to recognize the information focus. The grammar may also include an appearance location of a word or a phrase in the keyword. The appearance location determines a distance between the word or the phrase and the grammar centric word to reflect closeness of modification and information volume The semantics may include semantics label corresponding to the word. For instance, the semantics label may include a product name that marks the word is a particular product name or a portion of the particular product name, a brand name that marks the word is a particular brand name or a portion of the particular brand name, a geographical location that marks the word is a particular geographical name or a portion of the particular geographical name.

The statistics characteristics may include a frequency of appearance of the word in the inquiries. For instance, the statistics characteristics may include a frequency of the word as an independent single query, a frequency of the word as a centric word, and/or a frequency of the word as a modifier.

For instance, each characteristic may be set a value based on its influence to the importance of the word. The importance of the word may be measured by the multiplication of these values.

At a second step, multiple words sector in the keyword is identified. The multiple words sector refers to multiple words that constitute an overall meaningful language unit. The deletion of any word in the multiple words sector may lose the overall meaning.

For example, the multiple words sector may be identified based on statistics information. A number of times that any two or more words consecutively appear in the search click log and/or product titles is calculated. The higher the number of times is, the higher probability that these two or more words constitute the multiple words sector. As the multiple words sector cannot appear across different phrases, the multiple words sector is identified from each phrase classified within the keyword. In addition, a combination of brand name and product frequently occurs. However, such a combination may have two meanings and cannot be counted as one multiple words sector. An example calculation algorithm is as follows:

Firstly, a phrase is read and a starting location of the phrase is set as a starting location of a current multiple words sector.

Secondly, a current word and a next word are read. If the semantics of the current word is the brand name and the semantics of the next word is not the brand name, the multiple word sector is obtained from the starting location to a current location. Information of the multiple words sector is stored and a starting location of the next word is set as the starting location of a next multiple word sector.

Otherwise, it is determined whether a frequency of consecutive appearance of the current word and the next word is higher than a threshold C. If the frequency of consecutive appearances of the current word and the next word is not higher than the threshold C, the multiple words sector is obtained from the starting location to a current location. Information of the multiple word sector is stored and a starting location of the next word is set as a starting location of a next multiple word sector.

Thirdly, the current location is moved to a location of the next word until operations of all identifying multiple words sector in the phrase are completed. After the completion of identification of the multiple words sector, a word with a highest score within the multiple words sector is used as the importance score of the multiple words sector.

At a third step, the keyword is rewritten to search the relation table and obtain the recommended category. For example, a phrase with a highest importance score may be treated as information focus of the subject of the inquiry word and is retained. Such a phrase may be a word, term, or the multiple words sector. The phrase with a lowest score may be deleted. The rewritten keyword is used to search the relation table between the inquiry words and the categories. If the recommended category is obtained, it is returned as a result. Otherwise, another phrase with a current lowest score is deleted one by one and the rewritten keyword is used to search the relation table until the recommended category is obtained or there is no phrase to be deleted.

If the keyword input by the seller after the above rewriting process still cannot locate the recommended category, a machine learning method may be used to recommend the category. A following example formula may be used to calculate the posterior probabilities of the characteristics under each category in the search click log:

$$p(y \mid x) = \frac{1}{Z(x)} \exp\left(\sum_j \lambda_j f_j(x, y)\right)$$

y represents a category in the search click log. x represents the keyword input by the seller. $f_j(x, y)$ represents a $j^{th}$ characteristic of x under the category y. $\lambda_j$ represents a weight of the $j^{th}$ characteristic. $Z(x)$ represents a normalization factor.

For instance, with respect to given information included in the keyword, which include syntax-level, grammar-level, and/or semantics-level characteristics, a confidence degree for the keyword under a respective category may be defined by:

p(c is correct|x), which represents inquiring a posterior probability that the given information of the keyword x that correctly belongs the category. A conditional maximum entropy model may be used to calculate the posterior probability. The conditional maximum entropy model is just one example for calculating the posterior probabilities and cannot be used to restrict the present disclosure. Some other techniques may be used to calculate the posterior probabilities, such as the linear regression recursive method and the support vector machine method.

For example, some classified characteristics to be selected with respect to the keyword may include:

(1) a product, which marks the word as a product name and may be obtained from semantics analysis;
(2) a brand, which marks the word as a brand name and may be obtained from semantics analysis;
(3) a model, which marks the word a model name and may be obtained from semantics analysis;
(4) a centric word;
(5) all nouns;
(6) the centric word and a noun left to the centric word; and/or
(7) the centric word and a noun right to the centric word.

Figure 8:
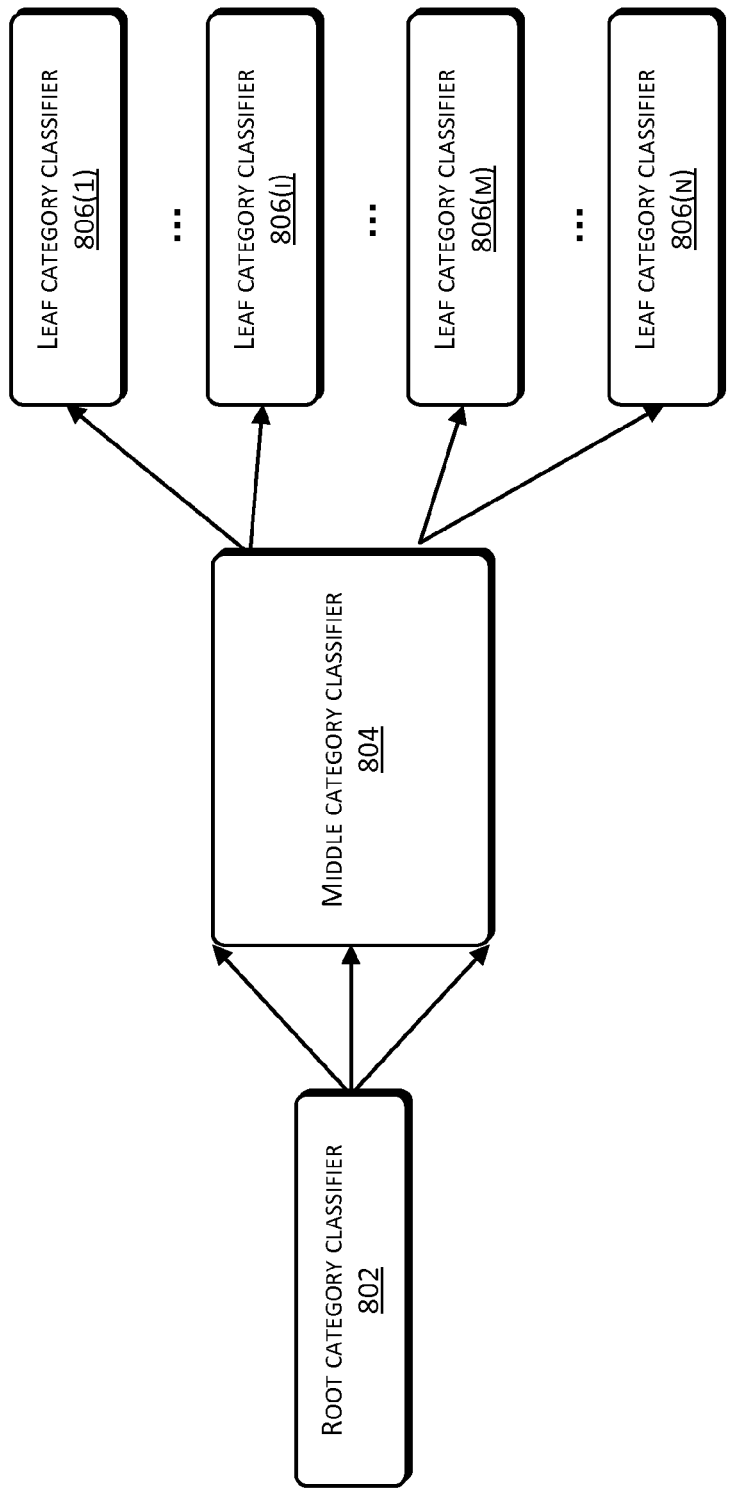
FIG. 8 illustrates a diagram of a classifier for inquiring categories of an example product information publishing apparatus.

An inquiry classifier machine is established based on the above classification algorithm. The keyword may be input into the inquiry classifier machine and the output is the classified result, which includes top N categories in the ranking and their confidence degrees. N may be any preset integer. FIG. 8 illustrates an example inquiry classifier that classifies the keyword input by the seller level-by-level until a category with satisfying confidence degree is obtained. In the example of FIG. 8, there is a root category classifier 802, a middle category classifier 804, and multiple leaf category classifiers 806 (1), . . . , 806($i$), . . . , 806($m$), 806($n$), where m, n may be any integer.

The machine learning method is data driven. The classifiers therein are derived based on automatic training of search data of the users and fit for user behaviors. Thus, the classifiers have strong self-adaptability and are easily applicable to scenarios where the category system changes frequently.

FIG. 9 illustrates a flowchart of an example category recommendation process conducted by an example product information publishing apparatus in accordance with the present disclosure.

At 902, the keyword of the product to be published is input by the seller.

At 904, the keyword is used to search in the inquiry and category relation table 906. For instance, the inquiry and category relation table 906 may be accomplished through an offline module 908. The offline module 908 establishes the inquiry and category relation table 906 based on a search click log of buyers 910 within a period of time such as 3 or more months by establishing correlation information 912 and training machine learning model 914. For example, the offline module 908 may establish the inquiry and category relation table 906 in advance based on stored data such as the search click log 910.

At 916, it is determined whether the keyword successfully matches one or more inquiry words in the inquiry and category table 906. If a result is positive, operations at 918 are performed; otherwise, operations at 920 are performed.

At 918, one or more categories corresponding to the matched inquiry word are determined as recommended categories of the seller's product. The process may end here.

At 920, the keyword input by the seller is rewritten. For example, one or more words in the keyword may be deleted.

At 922, it is determined whether the rewritten keyword successfully matches one or more inquiry words in the inquiry and category table 906. If a result is positive, operations at 918 are performed; otherwise, operations at 924 are performed.

At 924, a machine learning method is applied to provide the recommended categories to the seller's product. An online module 926 may be used to conduct training of one or more classifier models 926 for the machine learning method. For example, the online module 926 may conduct the analysis in real-time when the users conduct inquiries at the website.

In the above example product information publishing apparatus, when the seller publishes the product, the recommended categories are firstly provided to the seller based on the keyword of the product input by the seller. If the keyword of the product cannot find matches in the inquiry and category relation table, the keyword may be rewritten such that one or more words from the keyword may be deleted. If the rewritten keyword of the product still cannot find matches in the inquiry and category relation table, the machine learning method may be used. All of the three methods may be supplemental to each other.

In the above example embodiments, the present techniques, based on the stored search click log of the buyers, calculate the correlation information between the inquiry words and the categories in the search click log. When the seller publishes the product at the e-commerce website, a website server matches the keyword input by the seller to the inquiry words. The keyword may be a word or a phrase that includes one or more words. Based on the matching result and the above correlation relationship, the category corresponding to the matched inquiry is recommended to the seller so that the seller may accurately store the product information under a related category. The related category is a category that the buyer may select when the product information search is conducted by using the inquiry word that matches the keyword. When the buyers inquires the related product information to the website server according to the inquiry word, the website server obtains the related category corresponding to the received inquiry word in the search click log, and conducts the product information search within the related category. As the sellers have stored the product information in the related category when the sellers publish the product information, the web site server will quickly obtain and return the product information published by the sellers. As the returned product information matches the inquiry word, the probability that the buyer clicks the product information published by the seller increases. The present techniques also increase the accuracy of the recommended categories by the website to the seller and the return rate of the published product information.

One of ordinary skill in the art may understand that the embodiments of the present disclosure may be in the form of methods, apparatuses (devices or systems), or the programming products of computers. The above units or operations may be implemented by one or more general purpose computing devices. Such units or operations may be implemented by a single computing device or a distributive network composed of multiple computing devices. In addition, the present techniques may be implemented in the form of one or more computer program products containing the computer-executable instructions executable by one or more processors and stored in the computer storage medium (including but not limited to disks, CD-ROM, optical disks, etc.). Each of the modules may be implemented in a single integrated circuit. Alternatively, multiple modules may be implemented in the single integrated circuit. Therefore, the present disclosure may be implemented by hardware, software, or in combination of both and is not limited to any specific combination of hardware and/or software.

The present disclosure is described by referring to the flow charts and/or block diagrams of the method, apparatus (devices or systems) and computer program of the embodiments of the present disclosure. The sequence of the flow and block in the FIGs are not restrictive. Some other sequences may be used to implement the operations in the FIGS. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a apparatus of implementing one or more flows of the flow chart and/or one or more blocks of the block diagram can be generated through the instructions operated by a computer or other programmable data processors.

These computer program instructions may also be saved in other computer storage media which can instruct a computer or other programmable data processors to operate in a certain way, so that the instructions saved in the computer storage generate a product containing one or more instruction apparatuses. The instruction apparatuses implement the functionalities specified in one or more flows of the flow chart and/or one or more blocks of the block diagram.

These computer program instructions may also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The example embodiments as described in the present disclosure are merely for illustrating the present disclosure and are not intended to limit the scope of the present disclosure. One of ordinary skill in the art may make additional changes or modifications to the example embodiments. Within the principles of the present disclosure, any modification, alternation, or improvement of the present disclosure shall still be included in the protection scope of the present disclosure.

What is claimed is:

1. A method comprising:
    performing a matching of an input keyword to one or more inquiry words in a search click log;
    rewriting the input keyword in response to determining that the input keyword does not match any inquiry word in the search click log;
    obtaining one or more categories corresponding to at least one inquiry word in the search click log based at least in part on correlation information in response to determining that the rewritten keyword matches the at least one inquiry word in the search click log, wherein the correlation information is calculated between a plurality of inquiry words and a plurality of categories in the search click log by calculating confidence degrees of each category corresponding to a respective inquiry word, and wherein a confidence degree of a respective category corresponding to the respective inquiry word comprises a weighted combination of a first conditional probability between the respective inquiry word and the respective category when the respective category is clicked after the respective inquiry word is received, and a second conditional probability between the respective inquiry word and the respective category when one or more products under the respective category are clicked after the respective inquiry word is received; and
    publishing product information under the one or more obtained categories.

2. A method as recited in claim 1, further comprising:
    ranking the one or more obtained categories based on respective relevant degrees with the rewritten keyword; and
    selecting at least one category from the one or more obtained categories based on a result of the ranking.

3. A method as recited in claim 1, wherein rewriting the input keyword comprises deleting one or more words from the input keyword.

4. A method as recited in claim 1, rewriting the input keyword comprises:
    labeling a respective importance value for each word included in the input keyword; and
    deleting one or more words whose respective importance values are lower than a preset importance value threshold from the input keyword.

5. A method as recited in claim 4, wherein the respective importance value for each word included in the input keyword is labeled based on one or more of a respective syntax, grammar, semantics, or statistical characteristic of a respective word.

6. A method as recited in claim 1, further comprising:
    in response to determining that the rewritten keyword does not match any inquiry word in the search click log,
    classifying the input keyword into one or more characteristics;
    calculating a posterior probability of each of the one or more characteristics under each category in the search click log; and
    determining at least one category which posterior probability is higher than a preset threshold as a category that matches the input keyword.

7. A method as recited in claim 6, wherein the one or more characteristics include one or more of:
    a product that determines whether the input keyword is a product name;
    a brand that determines whether the input keyword is a brand name;
    a model that determines whether the input keyword is a model name;
    a centric word in the input keyword;
    one or more nouns in the input keyword;
    the centric word and a noun left to the centric word; or
    the centric word and a noun right to the centric word.

8. A method as recited in claim 6, wherein calculating the posterior probability of each of the one or more characteristics under each category comprises using a formula of $$p(y|x) = \frac{1}{Z(x)} \exp\left(\sum_j \lambda_j f_j(x, y)\right),$$

wherein:
    y represents a respective category in the search click log;
    x represents the input keyword;

$f_j(x, y)$ represents a $j^{th}$ characteristic of x under the respective category y;

$\lambda_j$ represents a weight of the $j^{th}$ characteristic; and $Z(x)$ represents a normalization factor.

9. A method as recited in claim 1, wherein the first conditional probability comprises a ratio between a number of times that the respective category is clicked within a period of time when the respective inquiry word is received, and a number of times that the respective inquiry word is received within the period of time.

10. A method as recited in claim 1, wherein the second conditional probability comprises a ratio between a number of times that the one or more products under the respective category are clicked within a period of time when the respective inquiry word is received, and a number of times that the respective inquiry word is received within the period of time.

11. A method as recited in claim 1, further comprising ranking the one or more obtained categories based on respective confidence degrees.

12. A method as recited in claim 1, wherein the search click log is established from clicking behaviors of buyers.

13. A method as recited in claim 1, wherein the input keyword is received from a seller.

14. A method comprising:
   performing a matching of an input keyword to one or more inquiry words in a search click log; in response to determining that the input keyword does not match any inquiry word in the search click log, rewriting the input keyword;
   performing a matching of the rewritten keyword to a plurality of inquiry words in the search click log; and
   in response to determining that the rewritten keyword does not match any inquiry word in the search click log,
      classifying the input keyword into one or more characteristics,
      calculating a probability of each characteristic of the one or more characteristics under each category in the search click log, and
      determining at least one category which probability is higher than a preset threshold as a category that matches the input keyword.

15. A method as recited in claim 14, wherein rewriting the input keyword comprises:
   labeling a respective importance value for each word included in the input keyword; and
   deleting a word which respective importance value is lower than a preset importance value threshold.

16. One or more computer storage media storing executable instructions that, when executed by one or more processors, cause the one or more processors to perform acts comprising:
   performing a matching of an input keyword to one or more inquiry words in a search click log; in response to determining that the input keyword does not match any inquiry word in the search click log, rewriting the input keyword;
   performing a matching of the rewritten keyword to a plurality of inquiry words in the search click log; and
   in response to determining that the rewritten keyword does not match any inquiry word in the search click log,
      classifying the input keyword into one or more characteristics,
      calculating a probability of each characteristic of the one or more characteristics under each category in the search click log, and
      determining at least one category having a probability being higher than a preset threshold as a category that match the input keyword.

17. The one or more computer storage media as recited in claim 16, wherein rewriting the input keyword comprises:
   labeling a respective importance value for each word included in the input keyword; and
   deleting a word which respective importance value is lower than a preset importance value threshold from the input keyword.

18. The one or more computer storage media as recited in claim 17, wherein the respective importance value for each word included in the input keyword is labeled based on one or more of a respective syntax, grammar, semantics, or statistical characteristic of a respective word.

19. The one or more computer storage media as recited in claim 16, wherein the one or more characteristics include one or more of:
   a product that determines whether the input keyword is a product name;
   a brand that determines whether the input keyword is a brand name;
   a model that determines whether the input keyword is a model name;
   a centric word in the input keyword;
   one or more nouns in the input keyword;
   the centric word and a noun left to the centric word; or
   the centric word and a noun right to the centric word.

* * * * *